United States Patent [19]
Jager et al.

[11] 4,394,215
[45] Jul. 19, 1983

[54] APPARATUS FOR CONVERTING COAL INTO LIQUID PRODUCTS

[75] Inventors: Berend Jager; Andries Brink, both of Sasolburg; Cornelis Kleynjan, Lochvaal, all of South Africa

[73] Assignee: Sasol One (Proprietary) Limited, Sasolburg, South Africa

[21] Appl. No.: 324,264

[22] Filed: Nov. 23, 1981

Related U.S. Application Data

[62] Division of Ser. No. 156,684, Jun. 5, 1980, Pat. No. 4,318,797.

[30] Foreign Application Priority Data

Jun. 18, 1979 [ZA] South Africa ........................ 79/2997

[51] Int. Cl.³ ........................ B01D 11/02; C10C 3/08; C10G 21/00

[52] U.S. Cl. .................................... 196/14.52; 202/84; 422/187

[58] Field of Search .................. 208/8 LE; 196/14.52, 196/98; 422/187, 208, 232; 202/84

[56] References Cited

U.S. PATENT DOCUMENTS

| | | | |
|---|---|---|---|
| 4,070,268 | 1/1978 | Davis et al. | 208/8 LE |
| 4,211,631 | 7/1980 | Carr et al. | 208/8 LE |
| 4,222,844 | 9/1980 | Nizamoff | 208/8 LE |
| 4,222,846 | 9/1980 | Schmid | 208/8 LE |
| 4,222,847 | 9/1980 | Carr et al. | 208/8 LE |
| 4,251,346 | 2/1981 | Dry et al. | 208/8 LE |
| 4,297,200 | 10/1981 | Briley | 208/8 LE |

*Primary Examiner*—Bradley Garris
*Attorney, Agent, or Firm*—Fred Wiviott

[57] ABSTRACT

The invention provides a process and an apparatus for hydrogenative liquefaction of coal to produce high yields of gasoline fraction and optional yields of diesel and residue fraction, all of superior quality. The coal is slurried and digested in two separate and distinct streams. The pasting oil of the first stream is heavy residue fraction derived to a substantial extent from the second stream, preferably mixed with light oil derived partly or wholly from the first stream. The pasting oil of the second stream is middle oil derived from the fractionated discharge of the first stream, any shortfall being made up from the discharge of the second stream. A high degree of flexibility is possible by varying the ratio of coal fed to the respective streams between 3:1 and 1:3, and individual manipulation of the process parameters within each stream in respect of pressure, temperature, catalyst, residence time, pasting oil composition and coal quality.

12 Claims, 2 Drawing Figures

APPARATUS FOR CONVERTING COAL INTO LIQUID PRODUCTS

This is a division, of application Ser. No. 156,684, filed June 5, 1980, now U.S. Pat. No. 4,318,797.

BACKGROUND OF THE INVENTION

The present invention relates to a process for converting coal directly into predominantly liquid products suitable for making hydrocarbon fuel, by slurrying the comminuted coal in a pasting oil and digesting the slurried coal under hydrogenative conditions at a temperature ranging from about 380° to about 500° C. and a pressure in the range of about 8 MPa (80 bar) to about 30 MPa (300 bar), if, and to the extent necessary, removing non-liquefied solids from the digested slurry, fractionating the digested slurry by distillation to produce a light oil fraction, a middle oil fraction and a heavy or residue fraction, the fraction cutting temperatures (reduced to atmospheric pressure) being about 200±50° C. between the light oil and middle oil and about 400±50° C. between the middle oil and the heavy or residue fraction and recycling part of said fractions to substantially or predominantly provide the pasting oil, and wherein one part of the coal is slurried and digested in a first stream (I) wherein the pasting oil comprises heavy or residue fraction, including a heavy or residue fraction derived from coal slurried and digested in a separate and distinct second stream (II).

A process of the aforesaid type, wherein the pasting oil comprises light oil in addition to the recycled heavy or residue fraction is proposed in earlier patent application Ser. No. 969,473 of the same assignee, now U.S. Pat. No. 4,251,346 and corresponding patents and patent applications in other countries, which are not to be considered as prior publications, but which by reference thereto are to be considered as part of the present disclosure. As described in those earlier applications, there exists a long and technologically important history of prior art which accordingly need not be repeated here.

These prior processes serve to produce products ranging from compounds which at room temperature are solid, right down to light liquids, usually with at least a substantial proportion of gaseous (and usually less desirable) products. In order to attain satisfactory degrees of extraction and liquefaction, most prior art processes employ hydrogenative conditions. Such hydrogenative conditions may partly or wholly be created by the use of a solvent having pronounced hydrogen donor properties, but are usually due at least in part to the employment of hydrogen under pressure, with or without an extraneously introduced hydrogenation catalyst.

Difficulties have been experienced in prior art processes to achieve adequate self-sufficiency in respect of solvent requirements and/or adequate solids carrying capacities of the solvent. Solvents which do have a desirable solid carrying capacity tend to result in net products mainly consisting of solid or near solid products, there being little or no net product in the highly desirable liquid hydrocarbon region. Increasing the hydrogenation rate, either in order to improve the depth of extraction or to increase the yield of liquids has sometimes tended to result in excessive gas yields. There exists a need in the art for a convenient process which is capable of producing high extract yields, particularly in the liquid hydrocarbon range, in particular the gasoline and optionally the diesel fuel range with low to modest hydrogen comsumption, very high pressures being avoided. At the same time the main products should be distillates which can be refined to conventional liquid fuels and chemcals without undue difficulty.

Preferred embodiments of the present invention are directed to process configurations capable of converting substantially all the liquefiable coal components to distillate products, whilst being capable optionally to be so modified that part of a distillation residue formed in the process is not recycled but withdrawn as a valuable byproduct having surprisingly superior characteristics as a raw material for making premium electrode coke.

An important advance in the art is proposed in the aforesaid Pat. No. 4,251,346. According to that proposal, the coal is slurried in a solvent system comprising at least 20% by mass of a comparatively low boiling fraction, liquid at room temperature and boiling not higher than 200° C., more than 10% by mass of a heavy or residue fraction, mostly solidifiable at room temperature, but liquid at the digesting temperature and not more than 30% by mass boiling between 200° and 450° C. The temperature for digesting the coal is maintained above the critical temperature of components of the low boiling fraction and the resulting mixture of solvent system and digestion products is fractionated distillatively so as to recover liquid hydrocarbons from such fractionating, those boiling from 200° to 450° C. constituting not less than 50% of the total liquid hydrocarbon net recovery whilst material comprising a fraction boiling below 200° C. and a bottom fraction is recycled to the slurrying stage.

More preferably, in that process the ratio of light oil to heavy residue in the pasting oil is from 3:1 to 1:3, preferably from 2:1 to 1:2. Within the boiling point range of 200° to 450° C. the material distribution pattern of the pasting oil (mass vs temp.) exhibits a gap or at least a pronounced minimum. The preferred digesting temperature is from 400° to 480° C. at a hydrogen partial pressure of from 5 to 25 MPa (50 to 250 bar), preferably in the presence of a hydrogenation catalyst, e.g. molybdenum, tungsten, iron or cobalt sulphides, e.g. introduced by impregnating the coal with amounts equivalent to 0,1 to 10% ammonium molybdate based on the dry mass of the coal.

The aforesaid process as described in the cited earlier patent application is usually conducted as a single stream process. However, the heavy residue fraction may be used wholly or in part as a raw material for making premium electrode coke of exceptionally high quality. In that event there may be a shortfall of heavy fraction for recycling to the pasting oil. Such shortfall is then made up by using heavy residue fraction derived from another, separate and independent coal extraction process stream.

The aforesaid proposal was directed predominantly at the direct production of liquid products boiling in the boiling range of diesel fuels. Although the process has substantial merit, there are disadvantages in that the products in the diesel oil boiling range require further hydrogenation, whereby the final yield of good quality diesel oil is reduced, mostly by the formation of lighter products in the gasoline boiling range. These latter, however, require substantial further treatment such as hydro treatment and platforming in order to meet gasoline specifications.

OBJECTS AND SUMMARY OF THE INVENTION

Starting from the aforesaid proposal, the present invention sets itself the difficult task of providing further improvements or advantageous modifications in a number of respects and in particular when not only high total yields of liquid in the liquid fuel range are desired, but where it is desired that a substantial proportion of that liquid fuel, say in excess of 40%, preferably 50% or more should be gasoline which should preferably be of a quality useful without expensive refining. The present invention can also be used to introduce a novel measure of flexibility in the ratios of liquid fuels in the diesel and gasoline boiling ranges respectively and in addition still provides the valuable facility for producing a high grade raw material for making premium electrode coke of a quality not only equal to, but often superior to that which is conventionally manufactured from scarce petroleum based raw materials. In this respect the process according to the present invention offers similar advantages to those of the process proposed in the aforesaid U.S. Pat. No. 4,251,346.

In accordance with the present invention, there is provided a process as set out in the opening paragraph wherein the pasting oil in the second stream (II) is substantially composed of recycled middle oil, incorporating about 50 to 100% of all the middle oil derived by fractionating the digested slurry of the first stream (I), whilst the pasting oil used for slurrying and digesting the coal of the first stream (I) incorporates about 50 to 100% of all the heavy or residue fraction derived by fractionating the digested slurry of the second stream (II), light oil derived by fractionating the digested slurry of the second stream (II) being withdrawn as a product or one of the products.

Although it may be preferred to distillatively fractionate the discharge of reactor streams (I) and (II) separately, this is not essential. All of this fractionation or (if the fractionation proceeds in a plurality of stages) part of this fractionation may be carried out on combined discharge materials of streams (I) and (II).

Preferably all or substantially all the light oil fractionated from the digested slurry of the second stream (II) is recovered as a product.

Light oil withdrawn from stream (II) is of surprisingly good quality and was found to be suitable for use in gasoline fuel after simple purification treatment, more particularly simple water wash (or where circumstances require a slight alkaline and/or acid wash) or adsorption or equivalent treatment, without further chemical modification or further refining other than distillation. The light oil product has a comparatively hgh aromatic content for which reason it is particularly suitable for being blended with a predominantly aliphatic hydrocarbon light oil product for use as gasoline. Such predominantly aliphatic light oil may for example be a Fischer-Tropsch fraction or a petroleum derived light refinery fraction.

Whilst a preferred embodiment contemplates that all or substantially all the light oil fractionated from the digested slurry of the stream (I) is recycled to the pasting stage of stream (I), the process can be so conducted that the light oil produced in stream (I) exceeds the amount recycled to the pasting oil for the first stream (I) and that the excess is withdrawn as a product. Usually part of the middle oil is withdrawn as a product, preferably all or mostly from stream (II). This middle oil product is surprisingly found to have a lower hetero atom content and to be therefore superior as a raw material for making diesel fuel to the middle oil derived from the first stream I and also to the middle oil which is the main product in accordance with the process of the aforesaid U.S. Pat. No. 4,251,346.

Nevertheless, in order to avoid a shortfall, it will usually be necessary to recycle between 33 and 100% of the middle oil fractionated from the digested slurry of the second stream (II) to the pasting oil of the second stream (II).

Preferably between 50 and 100%, more preferably all of the middle oil derived from stream (I) is recycled to stream (II), whilst any balance of said middle oil is withdrawn as a product, for example, e.g. when the middle oils from both streams (I and II) are recovered by combined fractionation, the total amount of middle oil recovered as a product may include between 8 and 45% middle oil derived from the digested slurry of stream (I).

The dry mass ratio of the amounts of coal fed to the first and second streams (I) and (II) respectively is normally in the range of from 3:1 to 1:3, more particularly in the range of from 2:1 to 1:2, usually in the range of from 1,5:1 to 1:1,5 and is substantially 1:1 in a preferred embodiment. The flexibility in these ratios is one of the keys to the flexibility of the process as a whole. It will be readily understood by those skilled in the art that in large-scale manufacture each individual stream can be carried out in a plurality of reactors connected as a number of parallel substreams, each substream comprising one or more reactors. Moreover, the basic construction of the reactors for streams (I) and (II) can be identical. Accordingly, the aforesaid ratios can be adjusted simply by changing the ratio of the number of reactors used in each stream and with little or no change in the throughput rate through the individual reactors.

A further parameter available for influencing the relative yields and qualities of different fractions available for recycling to the pasting oils and as products are the fraction cutting temperatures between the various fractions. The nominal fraction cutting point between the light oil and middle oil is 200° C., but this may be lowered to as little as about 150° C. to increase the available amount of middle oil at the expense of light oil, or it can be raised to say 230° C. or even as high as about 250° C. to achieve the opposite effect. The light oil generally has an initial distillation temperature of about 70°-80° C., but this can be lowered to as little as 35° C. or raised to as much as about 100° C. if greater or smaller quantities of this fraction are required.

Similarly the fraction cutting temperature between the middle oil and the heavy or residue fraction, though nominally 400° C., can be lowered to 370° C. or even 350° C. or raised to 420°-430° C. or even 450° C. to vary the relative available amounts of the two fractions. This measure of flexibility will be readily understood by the person skilled in the art having regard to the multiplicity of components in each fraction and the fact that an industrial distillative fractionation will never be absolute, there always remaining in each fraction minor amounts—say 1-5%—of components boiling outside each fraction cutting temperature.

It will also be understood by those skilled in the art that the quality of coal for both streams (I) and (II) can be the same, but that this is not necessarily so. Where different qualities of coal are readily available, it is possible in a manner which will be readily understood to manipulate the yields of products in the individual streams and their qualities to some extent by using such different qualities in the different streams of the process. In this regard it is pointed out that as in the case of the process according to U.S. Pat. No. 4,251,346, a wide variety of coals can be used, ranging from peat through brown coal to all kinds of liquefiable black coal (which term normally excludes anthracite which is generally not suitable for liquefaction by solvent extraction methods). For example, where in a given area both brown coal and liquefiable black coal are available, it may be advantageous to feed black coal to one stream and brown coal to the other stream. Different grades of coal for use in the different streams may also be derived from a single coal deposit, e.g. by selective mining or by sorting processes or by subjecting such coal to different degrees of coal washing.

The flexibility of the process allows for individual adjustment of the process conditions in each stream in respect of temperature, pressure, residence time and catalyst considerations, whether different coals are used in the feed streams or not, to optimise and/or control and/or adjust the required product distillation.

The residence time will be largely dictated in each stream by the remaining parameters in order to attain high yields of liquefied products. These residence times are generally in the range of about 10 to 120 minutes, in particular 20 to 80 minutes, and most frequently from about 40 to about 75 minutes. As will be understood by the person skilled in the art, severe digestion conditions tend to shorten the residence period and vice versa.

The heavy fractions or residue fractions referred to in the present specification are the bottoms fractions, that is to say the residue of the distillative fractionation which is undistillable at the cutting temperature of the medium oil fraction. Depending inter alia on the cutting temperature selected, this residue may still contain greater or lesser amounts, say between 5 and 30% by weight of substances which can be distilled off under vacuum (say at 1 mm Hg pressure) before substantial decomposition sets in. Usually this residue is completely solid or at least plastic at room temperature, typical ring and ball softening temperatures being from 80° C. upwards.

The process may be so conducted that there is no net yield of heavy or residue fraction at all. Such residue fraction which is formed in stream (II) is preferably totally recycled to the pasting stage of stream (I). The heavy residue resulting from the fractionation of the digestion product of stream (I) may also be quantitatively recycled to the pasting stage of stream (I). Even in that case there should be included an appropriate step of insoluble solids removal in order to prevent the build-up of such solids in the process. That step is advantageously included between the withdrawal of the digested product from stream (I) and its subsequent fractionation. Such solids removal can take place in any manner known in the art, although at present preferred methods are sedimentation or supercritical separation. It will not normally be necessary to separate solids from the material produced in stream (II), and this simplifies the process.

A modification of the process provides for the withdrawal of some of the heavy fraction products as a valuable product. This withdrawal preferably takes place from the fractionation products of stream (1), because any heavy fraction if withdrawn from stream (1) is of particularly high quality for use as a raw material in the manufacture of electrode coke. The amount of said heavy fraction product withdrawn may constitute between 0.1 and 30%, preferably from 5 to 20%, more preferably from 6 to 12% of the total heavy fraction produced in the total digestion products of all streams.

The quality of the heavy fraction as a raw material for manufacturing premium electrode coke is similar to that manufactured in accordance with U.S. Pat. No. 4,251,346. The manufacture of electrode coke from this material proceeds in a manner known per se.

The fractionation of the products of both streams also yields some gaseous products. These gaseous products can be reformed into hydrogen for use in the digestion streams.

Similarly, any "unreacted" coal (char) remaining after the digestion may advantageously be gasified and reformed into hydrogen.

The splitting of the coal digestion stage into separate and parallel process streams makes possible an improved control of the product spectrum of the process. Thus two digestion streams (I) and (II), either or both of which would separately not be self-sufficient in respect of their recycle streams, may be combined to obtain such self-sufficiency with a desired product spectrum unattainable by one stream alone. Some of the major constraints imposed on a single stream process by the need for self-sufficiency are thus removed.

The proess conditions of stream (II), apart from the intentional internal imbalance created within each individual stream in respect of solvent recycle sufficiency, can be substantially in accordance with any of the prior art pertaining to the manufacture of so-called solvent refined coal, also known as SRC, which conditions are known to persons skilled in the art and require no description. The reactors for both streams may be identical. For both streams, as regards the ratio of pasting oil to coal, substantially the same principles and numerical teachings apply as in the case of the process described in our aforesaid U.S. Pat. No. 4,251,346. Similarly, as regards the use of catalysts and pressures, substantially the same holds true except that it is sometimes preferred to use relatively more catalyst in either or both streams.

It is possible to use different pressures in streams (I) and (II).

Stream (I) can be conducted in any known manner capable of producing middle oil. In accordance with one modification of the process, stream (I) is operated under conditions substantially as known in the art for the H Coal process, more particularly the syncrude mode of that process, once again subject to possible intentional modifications made to create the aforesaid kind of internal imbalance within each individual stream in respect of solvent recycle sufficiency.

However, preferably in respect of stream (I) the teachings of our U.S. Pat. No. 4,251,346 apply in substance which earlier teachings are not here repeated but are to be considered part of the present disclosure by reference thereto, again subject to the aforesaid modifications in respect of the internal imbalance.

Stream (II) can be conducted in any previously proposed manner suitable for producing light oil and heavy fractions, including possibly appropriate modifications of the H-coal process, employing more severe reaction conditions than for conventional "solvent-refined coal" (SRC) production.

Also in accordance with the present invention, there is provided an apparatus for carrying out the process as set out above, comprising a first and a second coal digestion reactor for digesting particulate coal in a pasting oil under pressure, each reactor being preceded by a coal slurrying means and the reactors being succeeded by distillative fractionating means adapted to produce light oil, middle oil and heavy or residue fractions, means for recycling to the slurrying means of the first reactor, heavy or residue fraction derived at least in part from the second reactor, means for recycling to the slurrying means of the second reactor middle oil derived at least in part from the first reactor and means for discharging as a product light oil derived from the discharge of the second reactor.

The preferred embodiments further include means for recycling from the fractionating means light oil to the slurrying means preceding the first reactor, such light oil to include preferably light oil derived from the first reactor and optionally in part light oil derived from the discharge of the second reactor.

Preferably at least part of the fractionating means for the discharge of each reactor are separate and distinct. More preferably, the fractionating means are altogether separate and distince for each reactor.

The following examples serve to illustrate the present invention by way of working examples with reference to the accompanying diagrammatic drawings.

DETAILED DESCRIPTION OF THE DRAWINGS AND PREFERRED EMBODIMENTS

Figure 1:
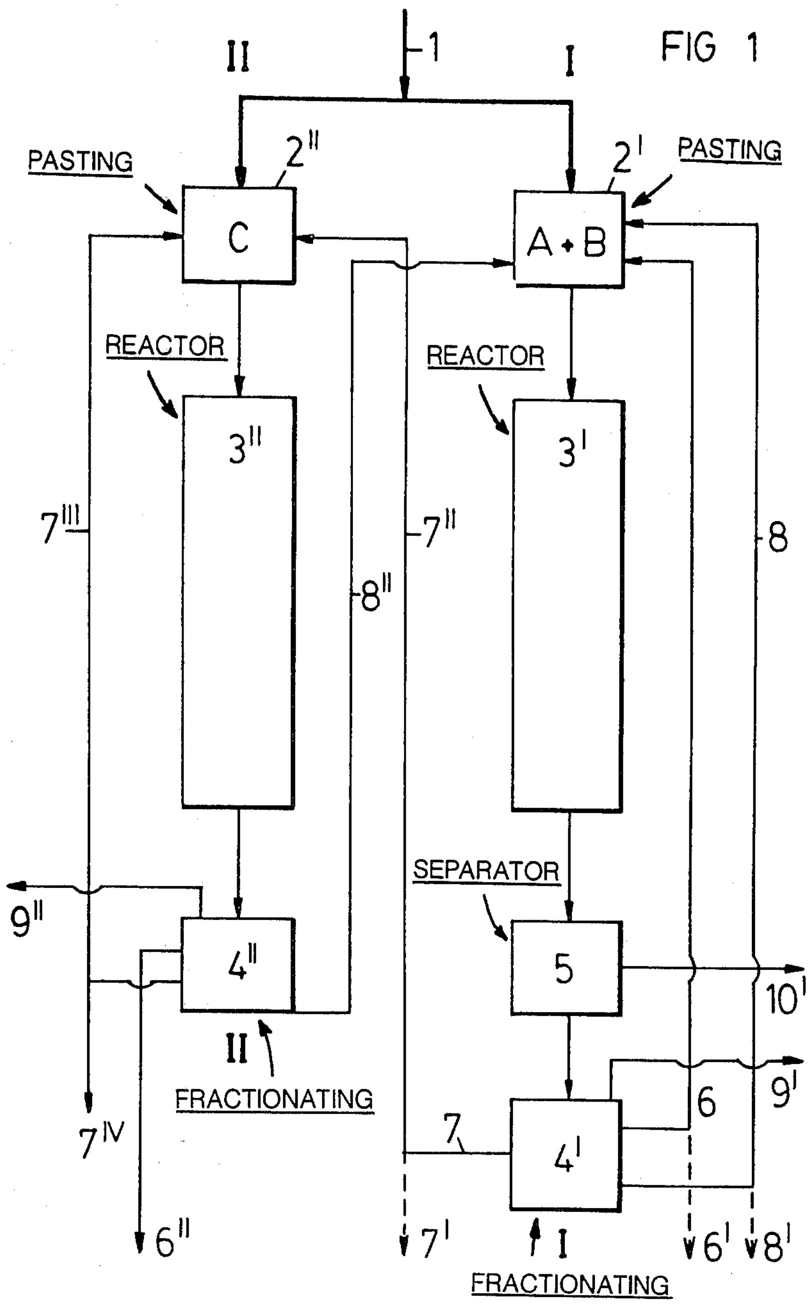
Figure 2:
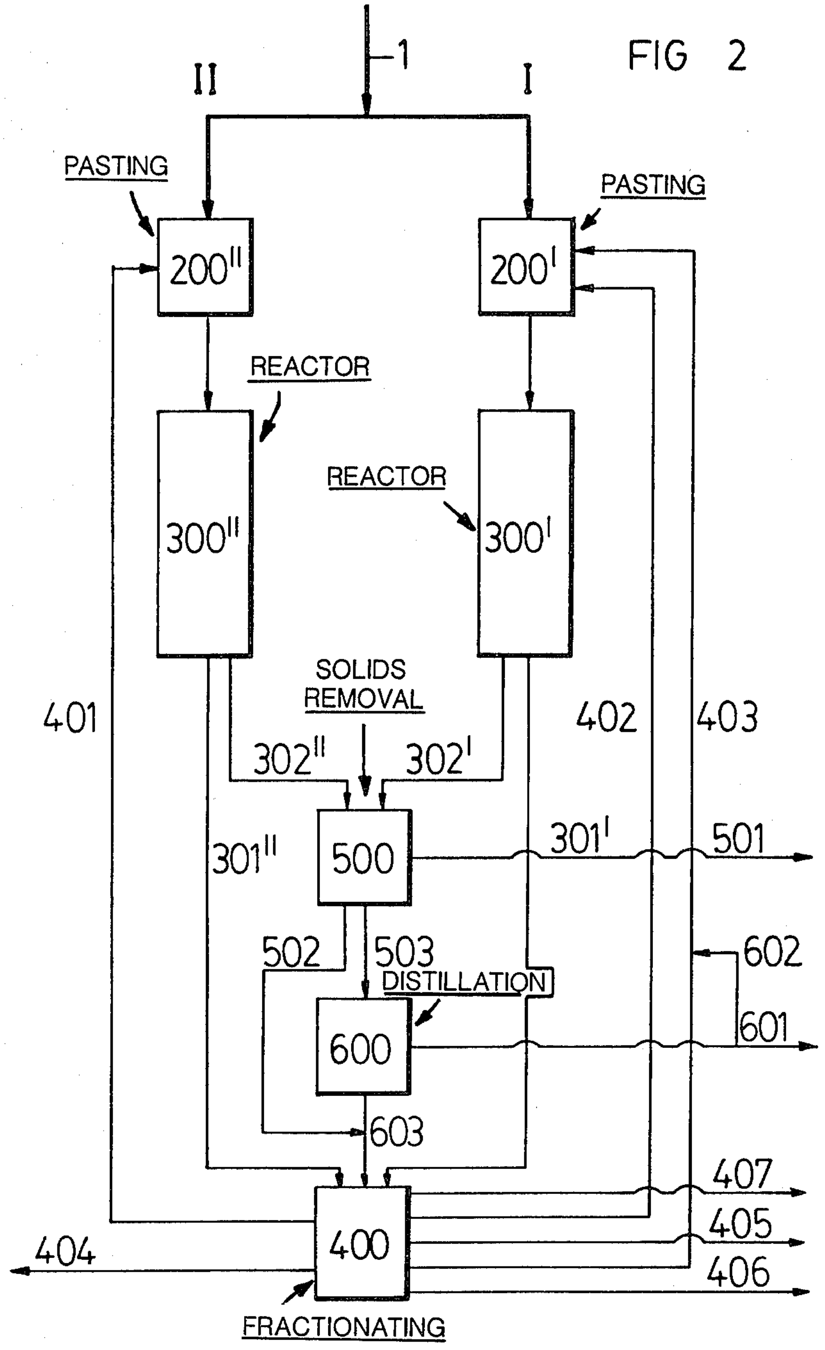

FIGS. 1 and 2 represent two flow diagrams of process and apparatus embodiments of the present invention.

Referring to FIG. 1, coal, diagrammatically indicated by heavy arrows, is split into two separate and distinct process streams diagrammatically denoted as I and II respectively. Each stream comprises in series a pasting stage 2' and 2'', respectively in which the coal in a comminuted state is pasted with a pasting oil, followed by a reactor 3' and 3'' respectively, in which the pasted coal is digested under pressure and at high temperature in the presence of molecular hydrogen, followed by a fractionating stage 4' and 4'' respectively in which a distillative fractionation of the digested liquid product takes place. In the case of stream (I) there is in addition provided between reactor 3' and fractionating apparatus 4' a solids separator 5, e.g. a rotary pressure filter, a centrifuge, sedimentation apparatus or a supercritical flash evaporator in which all liquid and gaseous products are flashed overhead and wherein only solids (ash and char) remain behind.

Referring now specifically to the fractionating stage 4' of stream (I), there is produced light oil 6 which is recycled to the pasting stage 2' to serve as the light oil component B of the pasting oil of stream (I). In the event that more light oil is produced than is needed in stream (I), such excess light oil may be withdrawn as a product 6'.

As light oil in the present context is to be considered the fraction boiling from about 70° C. up to about 200° C. although for recycling purposes the lowermost fractionating cut may be made at a slightly different, e.g. slightly higher temperature, say 80° C. The upper cut point may also deviate somewhat from 200° C. to suit particular process conditions.

The middle oil yielded by fractionator 4', being the fraction boiling between about 200° and 400° C.±50, is indicated by 7 and is split into a middle oil product stream 7' and a recycle stream 7'' which is recycled to pasting apparatus 2'' of coal stream (II), serving as part of the pasting oil component C of stream (II). The product stream 7' is optional.

The distillation residue of fractionating apparatus 4' is recycled as recycle stream 8 to the pasting apparatus 2' of stream (I), to serve as part of the heavy component A of the pasting oil for stream (I). Optionally part of the heavy fraction is withdrawn at 8', to serve as a valuable product, superior to conventional SRC and yielding premium electrode coke.

Fractionator 4' also yields, withdrawn at 9' $H_2S$, $CO_2$ and ammonia which are scrubbed out, unconnected hydrogen which is recycled, and CO and $C_1$ to $C_3$ hydrocarbon gases which are reformed into hydrogen for use in the reactors 3' and 3''. The solid carbon and ash withdrawn from separator 5 is indicated as 10'. It represents accumulated char from both reaction streams (I) and (II) combined.

Referring now specifically to the fractionator 4'' of stream (II), there is again produced light oil which in this case is withdrawn at 6'' as one of the main products of the process.

Middle oil obtained from reactor 3'' is recycled as middle oil stream 7''' to the slurrying and pasting apparatus 2'' of stream (II) to serve as the remainder of pasting oil C. That part of the middle oil which is not recycled to 2'' is recovered as a high quality middle oil product $7^{iv}$.

The non-distillable bottoms fraction of fractionator 4'' is recycled at 8'' to the slurrying and pasting apparatus 2' of stream (I) to make up the balance of heavy component A of the pasting oil.

Here as well, a comparatively small amount of $C_1$ to $C_3$ hydrocarbon and other gases are produced and withdrawn at 9'', to be dealt with in the same manner as the gases at $9^1$.

Referring now to FIG. 2 of the drawings, here as well the coal feed 1 is split into two separate and distinct process streams diagrammatically denoted as I and II respectively. As in the case of FIG. 1, each stream comprises a separate pasting section 200' and 200'' respectively in which the comminuted coal is pasted with a pasting oil and from where the pasted coal is fed into separate reactors 300' and 300'' respectively, having the same function as in the case of FIG. 1. However, the subsequent separating means are designed to serve both streams jointly.

These means comprise a single section 500 where solid residue is removed through line 501. Carbonaceous residue in that solid material may be gasified and converted into hydrogen.

If it is desired to recover a char- and ash-free heavy fraction, the liquid discharge from solids removal section 500 passes through line 503 to a section 600 where the more readily distillable components are distilled off and pass to the distillative fractionation section 400, whilst the heavy residue is removed through line 601.

The overheads from section 600 pass through line 603 to section 400, whilst any of the discharge of section 500 may also bypass section 600 and be fed directly into section 400 via line 502.

Any discharge from the reactors 300' and 300'' which is not fed via sections 500 and 600 passes directly into the distillative fractionation section 400 via line 301' and 301''.

In general the heavy fraction produced in section 600 is intended as a raw material for the manufacture of electrode coke. For that purpose the heavy fraction derived from reactor 300' of stream 1 is substantially superior to that derivable from stream 11. Accordingly, in that event, it is preferable for the material passing through sections 500 and 600 to be derived predominantly or preferably entirely from the discharge of reactor 300' of stream I. In that case the discharge from reactor 300" will predominantly or preferably wholly bypass sections 500 and 600 and be fed directly into the distillative fractionation section 400 via line 301".

Those products of reactors 300' and 300" which are fed to the distillative fractionation section 400 through lines 301' and 301", 502 and 603 are now fractionated jointly in sections 400 to yield the following product streams:

Stream 401 which is a middle oil stream recycled to the pasting stage 200" of stream II, there to be pasted with coal for stream II;

Stream 402, a light oil stream which is recycled to the pasting stage 200' where it is pasted with the coal for stream I;

Stream 403, being a heavy fraction which is recycled also to pasting stage 200', there to be pasted with coal in stream (I);

Stream 404 by which a final middle oil product (if any) is removed from section 400. This middle oil may be identical to the oil in stream 401 or it may be somewhat different in order to suit downstream processes;

Stream 405 by which light oil product is removed from section 400. This light oil may be identical to the light oil in stream 402 or it may be suitably adjusted in the fractionation column to suit downstream process requirements;

Stream 406 is a heavy fraction product which may be somewhat different from the recycled heavy fraction of stream 403. The withdrawal of product 406 is optional, and if it is to serve as an additive for non-coking or poorly coking coal in coke making, it need not be ash- and char-free.

Stream 407, being hydrocarbon gases ($C_1$–$C_3$) and other gases which may be used for hydrogen production and recycling or removal.

Even if no heavy fraction is withdrawn as a product at all, a certain amount of solids separation in section 500 is necessary, in order to prevent build-up of solids in the system. However, in that case the solids separation need not be very efficient.

If the amount of heavy fraction available from section 400 for recycling via line 403 is insufficient, the quantity can be made up with heavy fraction via line 602 from section 600.

A number of variations from the flow sheet according to FIG. 2 are possible in a manner which will be readily understood by the person skilled in the art:

Separate solids separation means 500 may be provided for process streams (I) and (II), whilst fractionation section 600 and 400 serve both process streams; or separate sections 500 and 600 are provided for streams (I) and (II), whilst section 400 is combined for both streams; or there may be a section 500, a section 600 and a section 400 serving both process streams and a separate section 400 serving a portion of either process stream (I) of process stream (II).

EXAMPLE 1

The coal used in this example is washed Waterberg bituminous coal milled to a powder finer than 0.1 mm to suit the requirements of the pump used. A coarser size, e.g. 0.6 mm is acceptable, depending on the pumps. The coal is impregnated with a solution of ammonium molybdate and divided into separate streams I and II of FIG. 1. The coal for both streams, after drying, contained 3,0 mass percent of $MoO_3$. The moisture content of the coal is 2% and the ash content 12%. During the impregnation a small, stoichiometrical amount of elemental sulphur was added in order to rapidly convert the catalyst into the sulphide form.

The mass ratio of the coal in streams (I) and (II) is 1:1 and in each case the ratio of pasting oil to coal including ash and moisture is 3,0:1. The digestion temperature in both reactors 3' and 3" is 450° C. and the pressure in both reactors 3' and 3" is 20 MPa (200 bar), i.e. the pressure at which hydrogen is fed into each reactor. The partial pressure of hydrogen inside the reactor is not very critical and drops from the feed end to the discharge. The partial pressure of hydrogen in stream (I) is usually lower than in stream (II).

The residence time for both streams was 75 minutes. The following table summarises the compositions of the pasting oils for each stream. The cutting temperatures between the fractions were 200° C. and 400° C.

| Compositions of pasting oil in mass % | |
|---|---|
| Stream I | Stream II |
| 33% light oil ex I | 23% middle oil ex I |
| 54% heavy oil ex I | 77% middle oil ex II |
| 13% heavy oil ex II | |

The following is a summary of the results, based on two streams of 100 kg coal each:

The fractionating means 4" of stream (II) yielded the following volatiles:

Water, $CO_2$, CO 14 kg; hydrocarbon gas $C_1$–$C_3$ 11 kg, light oil 53 kg, middle oil 36 kg. The heavy residue fraction consisted of 41 kg heavy extract similar to SRC, 3 kg unreacted coal and 12 kg ash. The whole heavy bottoms fraction was passed to the pasting stage of stream (I). The total amount of middle oil recycled from the fractionating stage 4" of stream (II) back of the pasting stage of stream (II) amounted to 229 kg.

The fractionating stage 4' of stream (I) yielded the following products: water, $CO_2$ and CO 13 kg; hydrocarbon gases ($C_1$–$C_3$) 19 kg; light oil 7 kg; heavy extract (of higher quality than SRC) 16 kg. The solids separation stage 5' yielded 7 kg unreacted coal and 24 kg ash. In addition the fractionating stage 4' yielded 71 kg middle oil, all of which was recycled to the pasting stage of stream (II).

The interim recycled streams from the fractionating stage 4' of stream (I) to the pasting stage of stream (I) represented the following quantities:

100 kg light oil and 159 kg heavy fraction.

The total net yield from the 200 kg of coal was as follows:

| | |
|---|---|
| Water, CO, $CO_2$ | 27 kg |
| Gas ($C_1$–$C_3$) | 30 kg |
| light oil | 60 kg |
| Middle oil | 36 kg |
| high quality heavy extract | 16 kg |
| Carbon residue | 7 kg |
| Ash | 24 kg |
| | 200 kg |

In practice the carbon will be fed into gasification plant for the production of hydrogen. Similarly, the gas, including CO will be reformed into hydrogen.

The light oil collected during these experiments, when given a single water wash, had a research octane number (RON) of 91,6.

The middle oil from stream I had a cetane number of 41. The middle oil from II was superior in colour to the middle oil of stream I and had undergone chemical changes which improve the cetane number. The superior quality of the middle oil of stream II over that of stream I is apparent from the following analyses.

| Item determined | Middle oil, percentage contents Stream I | Stream II |
|---|---|---|
| C | 85,8 | 88,9 |
| H | 8,8 | 8,6 |
| N | 1,8 | 0,6 |
| S | 0,2 | 0,02 |
| O | 3,4 | 1,9 |
| phenols | 12,5 | 1,2 |

EXAMPLE 2

Example 1 is repeated, however, whereas in Example 1 valuable heavy extract is produced, in this example no such material is wanted and motor fuels are the only required products.

The conditions are similar to that in Example 1. For this example, however, 100 kg coal is fed to 2" and 162 kg coal is fed to 2'. The recycle streams to 2" and 2' respectively, are adjusted to maintain the same compositions of the pasting oils as in Example 1.

The overall net yields (I+II) based on total coal (dry and ash-free basis) in weight % are:

| | |
|---|---|
| Water + CO + $CO_2$ | 13,2% |
| gas ($C_1$-$C_3$) | 18,4% |
| light oil | 28,5% |
| middle oil | 35,9% |
| heavy extract | 0% |
| char | 4,1% |

EXAMPLE 3

The following are typical net yields when changing the ratio of coal fed to stream (I): coal fed to stream (II).

| RATIO I:II | WEIGHT % BASED ON TOTAL COAL, DRY ASH-FREE BASIS LIGHT OIL | MIDDLE OIL | HEAVY FRACTION | GAS ($C_1$-$C_3$) | $H_2O$ + CO + $CO_2$ |
|---|---|---|---|---|---|
| 3:1 | 21,5 | 41,8 | — | 19,5 | 13,0 |
| 2:1 | 26,0 | 38,0 | — | 18,8 | 13,1 |
| 1,62:1 | 28,5 | 35,9 | 0 | 18,4 | 13,2 |
| 1,5:1 | 29,5 | 33,5 | 1,4 | 18,2 | 13,2 |
| 1:1 | 35,0 | 21,2 | 9,2 | 17,4 | 13,3 |
| 1:1,5 | 40,3 | 8,8 | 16,9 | 16,5 | 13,4 |
| 1:2 | 44,0 | 0,5 | 22,1 | 16,0 | 13,5 |
| 1:3 | 48,5 | — | 18,7 | 15,3 | 13,6 |

In the aforegoing, unless otherwise stated, the cut points between light oil and middle oil are 200° C. and between middle oil and heavy fraction 420° C. In the case of high ratios of I to II, conditions have to be modified slightly to avoid a shortfall in the overall yield of heavy fraction. For this purpose the catalyst content in stream I is lowered as follows:

EXAMPLE 4

Example 1 is repeated with brown coal at a digesting temperature of 410° C. The catalyst content is increased to 5 mass percent of $MoO_3$ based on dry mass of coal. The hydrogen feed pressure is raised to 30 MPa (300 bar). The average residence period in the reactor is 60 minutes.

The following net yields were obtained from 200 kg coal:

| | |
|---|---|
| $H_2O$, CO, $CO_2$ | 60 kg |
| Hydrocarbon gases | 20 kg |
| light oil | 75 kg |
| middle oil | 25 kg |
| heavy residue | — |
| unreacted carbon | 10 kg |
| ash | 10 kg |

Similar results are attainable, if the hydrogen feed pressure is lowered to about 8 MPa and the catalyst content is raised to about 10%, provided the residence time is increased to about 120 minutes.

EXAMPLE 5

Example 1 is repeated with bituminous black coal at a digesting temperature of 480° C. The catalyst content is $3\frac{1}{2}$% by mass.

The hydrogen feed pressure is 20 MPa, which is also the pressure in the reactors. The average residence period in the reactors is 40 minutes.

The following net yields are obtained from 200 kg coal:

| | |
|---|---|
| $H_2O$, CO, $CO_2$ | 60 kg |
| hydrocarbon gases | 30 kg |
| light oil | 65 kg |
| middle oil | 10 kg |
| heavy residue | 10 kg |
| unreacted coal | 15 kg |
| ash | 10 kg |

In a further variation on this example the residence period in stream II is reduced to 20–25 minutes by increasing the catalyst content to 10% by mass, and raising the hydrogen feed pressure to 30 MPa. Under these conditions the net yield of middle oil is lowered to 5–0 kg and the light oil yield is increased to 70–75 kg.

Further lowering of the residence time requires the use of a more reactive coal and/or some sacrifice in total yields of liquefied products.

EXAMPLE 6

The same process conditions are used as described in Example 1, but applied to the flow sheet according to FIG. 2. The mass ratio of coal fed to streams I and II respectively is 1,62:1. The residence time in both streams is 70 minutes.

All streams are combined at 500 except for gases which are separated by means not shown and passed directly to work-up section 400. The table A summarises all input and output data of the various streams:

The experiment is repeated, however, in order to produce a net yield of high grade heavy residue suitable for electrode coke production the mass ratio of coal fed to streams I and II respectfully is adjusted to 1:1. The input and output data are summarised in Table B.

TABLE A (all in kg)
Total coal feed 901,3 kg (dry, ash-free); I:II = 1,62:1
(ash content 125,8 kg, moisture 21,0 kg).

| Item in FIG. 2 | $H_2O$, CO, $CO_2$ | Hydro-carbon gas | Light oil | Middle oil | Heavy residue | Unreacted + ash |
|---|---|---|---|---|---|---|
| 200' | 13,0 | | 648,0 | | 1296,0 | 77,8 |
| 200" | 8,0 | | | 1200,0 | | 48,0 |
| 301' | 84,1 | 120,5 | | | | |
| 302' | | | 694,0 | 458,6 | 1133,0 | 101,9 |
| 301" | 55,9 | 44,3 | | | | |
| 302" | | | 216,8 | 1060,4 | 163,0 | 60,6 |
| 501 | | | | | | 162,5 |
| 502 | | | 910,8 | 1519,0 | 1296,0 | |
| 401 | | | | 1200,0 | | |
| 402 | | | 648,0 | | | |
| 403 | | | | | 1296,0 | |
| 404 | | | | 319,0 | | |
| 405 | | | 262,8 | | | |
| 407 | 139,0 | 164,8 | | | | |
| Total net yield | 139,0 | 164,8 | 262,8 | 319,0 | 0 | 162,5 |

TABLE B (all in kg)
Total coal feed 688,0 kg (dry, ash-free); I:II = 1:1
(ash content 96,0 kg; moisture 16,0 kg)

| Item in FIG 2 | $H_2O$, CO, $CO_2$ | Hydro-carbon gas | Light oil | Middle oil | Heavy Residue | Unreacted + ash |
|---|---|---|---|---|---|---|
| 200' | 8,0 | | 400,0 | | 800 | 108,6 |
| 200" | 8,0 | | | 1200 | | |
| 301' | 51,9 | 74,4 | | | | |
| 302' | | | 428,4 | 282,8 | 699,6 | 123,5 |
| 301" | 54,9 | 44,3 | 216,8 | 1060,4 | 163,0 | 60,6 |
| 302" | | | | | | |
| 501 | | | | | | 123,5 |
| 502 | | | 390,1 | 257,3 | 637,0 | |
| 503 | | | 38,3 | 25,5 | 62,6 | |
| 601 | | | | | 62,6 | |
| 603 | | | 38,3 | 25,5 | | |
| 401 | | | | 1200,0 | | |
| 402 | | | 400,0 | | | |
| 403 | | | | | 800 | 60,6 |
| 404 | | | | 143,2 | | |
| 405 | | | 245,2 | | | |
| 407 | 106,8 | 118,7 | | | | |
| Net yield | 106,8 | 118,7 | 245,2 | 143,2 | 62,6 | 123,5 |

The following advantages have been observed in testing the process.

(a) the yields of different products can be easily adjusted to the needs of the moment and without expensive additional plant or (within substantial limits) without materially impairing the quality.

(b) The process is particularly suitable for the simultaneous manufacture of both diesel fuel and gasoline fuel. Surprisingly the quality of the middle oil fraction is superior for the manufacture of diesel oil as compared with the middle oil produced in the process according to U.S. Pat. No. 4,251,346. Also surprisingly, the light oil fraction is of a quality substantially superior to that produced in that patent and can be used for the manufacture of gasoline with very simple refining. This gasoline fraction is particularly superior for blending with highly aliphatic light oil fractions such as Fischer Tropsch petrol.

(c) It is possible optionally to withdraw from the process substantial yields of heavy fraction of a quality superior to conventional SRC for the purpose of conversion into high quality carbon electrodes. This can be done without noteworthy adverse effect on the qualities of the remaining products.

(d) The greater extent of hydrocracking and the quality improvements are attained without in any way adversely affecting the throughput capacity of the plant in terms of amount of coal processed as compared with the same size plants as described in our U.S. Pat. No. 4,251,346. Indeed, as a result of reduced refinement needs, the yield of final liquid motor fuel is improved.

The appended claims are to be considered as a part of this disclosure.

We claim:

1. An apparatus for carrying out a coal liquefaction process comprising in parallel separate and distinct first and second coal digestion reactors for digesting particulate coal in a pasting oil under pressure, first and second separate and distinct coal slurrying means feeding separately into the first and second reactors respectively, fractionating means coupled to said first and second reactors and adapted to produce light oil, middle oil and heavy or residue fractions, means for recycling to the first slurrying means heavy or residue fraction derived at least in part from the discharge of the second reactor, means for recycling to the second slurrying means middle oil derived at least in part from the discharge of the first reactor, and means for discharging as a product light oil derived from the discharge of the second reactor.

2. Apparatus according to claim 1 comprising means for recycling light oil from the fractionating means to the first slurrying means.

3. Apparatus according to claim 2, wherein the means for recycling light oil are adapted to recycle light oil derived from the discharge of the first reactor to the first slurrying means.

4. Apparatus according to claim 3, wherein the means for recycling light oil are also adapted to recycle in part light oil derived from the discharge of the second reactor.

5. Apparatus according to claim 1, wherein the fractionating means comprise first and second separate and distinct fractionating means by which the first and second reactors are respectively succeeded for the separate fractionation of the discharge of each reactor.

6. Apparatus according to claim 1, wherein the fractionating means is adapted for the combined fractionation of discharge material derived from both said first and second reactors.

7. Apparatus according to claim 6, wherein the fractionating means comprise a fractionating portion adapted for the fractionation of discharge material derived from one of the reactors, separate from discharge material of the other reactor.

8. Apparatus according to claim 1 including solids separating means interspersed between the first reactor and said fractionating means.

9. Apparatus according to claim 8, and including means connected to said second reactor and the fractionating means for bypassing the discharge of the second reactor around the solids separating means.

10. Apparatus according to claim 8, comprising means for discharging as a product heavy or residue fraction derived from the discharge of the first reactor after its passage through the solids separating means.

11. Apparatus according to claim 1, wherein the first and second reactors and the first and second coal slurrying means are constructed and arranged for coal feed rates to the respective reactors in a dry mass ratio ranging from 3:1 to 1:3.

12. Apparatus according to claim 1 comprising discharge means for discharging as a product middle oil derived from the discharge of the second reactor.

* * * * *